US009126332B2

(12) United States Patent
Caron L'Ecuyer et al.

(10) Patent No.: US 9,126,332 B2
(45) Date of Patent: Sep. 8, 2015

(54) ROBOTIC ARM WITH A PLURALITY OF MOTORIZED JOINTS

(75) Inventors: Louis Jospeh Caron L'Ecuyer, Montréal (CA); Charles Deguire, Montréal (CA)

(73) Assignee: KINOVA, Boisbriand (CA)

( * ) Notice: Subject to any disclaimer, the term of this patent is extended or adjusted under 35 U.S.C. 154(b) by 1150 days.

(21) Appl. No.: 13/122,738

(22) PCT Filed: Oct. 6, 2009

(86) PCT No.: PCT/CA2009/001419
§ 371 (c)(1),
(2), (4) Date: Jul. 4, 2011

(87) PCT Pub. No.: WO2010/040215
PCT Pub. Date: Apr. 15, 2010

(65) Prior Publication Data
US 2011/0257786 A1 Oct. 20, 2011

Related U.S. Application Data

(60) Provisional application No. 61/102,964, filed on Oct. 6, 2008.

(51) Int. Cl.
*B25J 9/06* (2006.01)
*B25J 9/08* (2006.01)
(Continued)

(52) U.S. Cl.
CPC ... *B25J 9/08* (2013.01); *A61G 5/10* (2013.01); *B25J 9/06* (2013.01); *B25J 13/082* (2013.01);
(Continued)

(58) Field of Classification Search
CPC .................. B25J 1/02; B25J 9/06; B25J 9/08
USPC ........................................ 414/9, 729; 901/28
See application file for complete search history.

(56) References Cited

U.S. PATENT DOCUMENTS 4,046,262 A * 9/1977 Vykukal et al. ................ 901/28
4,736,645 A * 4/1988 Zimmer .......................... 901/26
(Continued)

FOREIGN PATENT DOCUMENTS

| EP | 1129828 | 9/2001 | |
| EP | 1129828 A1 * | 9/2001 | ................ B25J 9/04 |
| JP | 60067093 | 4/1985 | |

OTHER PUBLICATIONS

PCT International Search Report of PCT/CA2009/001419.

*Primary Examiner* — Gerald McClain
(74) *Attorney, Agent, or Firm* — Norton Rose Fulbright Canada LLP

(57) ABSTRACT

A portable robotic arm comprises a base, a plurality of motorized joints, a plurality of body members and a manipulator. Each motorized joint is operative to rotate in its respective rotation plane and on its respective joint axis, which is normal to the respective rotating plane. Each body member is sequentially connected to one other body member through one of the motorized joints. A last body member is connected to the base through a last motorized joint. A manipulator is connected to a first body member through a first motorized joint. At least two consecutive rotation planes are placed at an angle from each other that is greater than 0 degrees and smaller than 90 degrees. Optionally, the manipulator comprises three fingers and a tool port centered between the three fingers. A tool connected in the manipulator's tool port may be gripped with the three fingers. The robotic arm and a wheelchair support for the robotic arm may also be provided as a kit.

20 Claims, 7 Drawing Sheets

(51) Int. Cl.
  *A61G 5/10* (2006.01)
  *B25J 13/08* (2006.01)
  *B25J 15/10* (2006.01)
  *B25J 17/02* (2006.01)

(52) U.S. Cl.
  CPC ............... *B25J 15/10* (2013.01); *B25J 17/025* (2013.01); *A61G 2203/38* (2013.01); *Y10T 74/20329* (2015.01)

(56) References Cited

U.S. PATENT DOCUMENTS

| | | | |
|---|---|---|---|
| 4,771,652 A * | 9/1988 | Zimmer | 901/29 |
| 4,904,148 A * | 2/1990 | Larsson | 901/28 |
| 4,990,050 A * | 2/1991 | Tsuge et al. | 901/29 |
| 5,280,981 A | 1/1994 | Schulz | |
| 5,355,743 A * | 10/1994 | Tesar | 901/28 |
| 5,850,762 A * | 12/1998 | Kochanneck | 901/28 |
| 6,408,224 B1 * | 6/2002 | Okamoto et al. | 74/490.05 |
| 6,430,475 B2 * | 8/2002 | Okamoto et al. | 901/28 |
| 6,922,610 B2 * | 7/2005 | Okamoto et al. | 901/25 |
| 6,978,193 B2 * | 12/2005 | Kamon et al. | 700/245 |
| 7,971,504 B2 * | 7/2011 | Haniya et al. | 74/490.03 |
| 2004/0129103 A1 * | 7/2004 | Kamon et al. | 74/490.01 |
| 2007/0095582 A1 | 5/2007 | Stuijt et al. | |
| 2015/0068349 A1 * | 3/2015 | Hirabayashi | 901/28 |
| 2015/0068350 A1 * | 3/2015 | Kirihara et al. | 901/28 |

\* cited by examiner

ROBOTIC ARM WITH A PLURALITY OF MOTORIZED JOINTS

CROSS-REFERENCE TO RELATED APPLICATIONS

The present patent application is a United States national stage under 35 U.S.C. 371, and claims priority on U.S. Provisional Patent Application No. 61/102,964, filed on Oct. 6, 2008.

FIELD OF THE APPLICATION

The present application generally relates to the field of robotics. More specifically, the application relates to a portable robotic arm with an improved wrist design.

BACKGROUND OF THE ART

For handicapped persons having only limited use of their arms, accomplishing on their own mundane tasks on a daily basis, such as drinking or brushing teeth for example, is a complex procedure. Luckily, robotic arms have been designed or adapted to provide them much needed help.

Many of these robotic arms have been prototyped and much research on this topic is still going on in universities. Unfortunately, not that many robotic arms have successfully made it to the marketplace. Many robotic arms are expensive, as they were not designed for mass production. They are also not well adapted for a mobile use since they are bulky, have a low load capacity to weight ratio and are not easily transferable from one place of use to another (for example from a wheelchair to a counter). Moreover, their design is sometimes prone to inflicting injuries to a user or a bystander, such as pinching fingers in the arm's joints. This is especially true close to the manipulator, or gripper, area of the robotic arm, which normally uses more of its available movement amplitude.

Over the last decade, there have been many interesting attempts to produce a convenient portable robotic arm. However, every design has always left something to be desired. There is therefore a clear need for an improved portable robotic arm.

SUMMARY OF THE APPLICATION

It is an object of the present application to provide a portable robotic arm and method that address issues associated with the prior art.

The present application provides the advantages of being easier to assemble from a knocked-down state due to its modular construction, is relatively light, and is designed such as to lower dangers of pinching a user's fingers in a wrist region of the robotic arm. The robotic arm of the present application is also potentially cheaper to manufacture than many other robotic arms built for personal use due to its modular construction.

In accordance with an embodiment of the present application, there is provided a portable robotic arm that comprises a base, a plurality of motorized joints, a plurality of body members and a manipulator. Each motorized joint is operative to rotate in its respective rotation plane and on its respective joint axis, which is normal to the respective rotating plane. Each body member is sequentially connected to one other body member through one of the motorized joints. A last body member is connected to the base through a last motorized joint. A manipulator is connected to a first body member through a first motorized joint. At least two consecutive rotation planes are placed at an angle from each other that is greater than 0 degrees and smaller than 90 degrees.

Optionally, the base may have an attachment interface that is operative to removably attach the base to a support.

Optionally, the manipulator may comprise three fingers and a tool port centered between the three fingers. Each of the three fingers may be equipped with sensors to detect a load applied on the fingers.

In accordance with another embodiment of the present application, there is provided a method for connecting a tool to the previously described robotic arm. The method comprises gripping with the three fingers a tool connected in the manipulator's tool port.

In accordance with yet another embodiment of the present application, there is provided a kit comprising the robotic arm as previously described and a wheelchair support. The wheelchair support is adapted to removably receive an attachment interface of the robotic arm. The wheelchair support is further provided with attaching means for being attached to a frame of a wheelchair.

In accordance with a first embodiment of the present disclosure, there is provided a robotic arm comprising: a base; a plurality of motorized joints, each one of said plurality of motorized joints being operative to rotate a body member with respect to one respective joint axis normal to a respective rotating plane; a plurality of the body members, each one of said plurality of body members being sequentially connected to ends of at least one other of said plurality of body members through one of said plurality of motorized joints, a last one of said plurality of body members being connected to said base through a last one of the motorized joints of said plurality of motorized joints; and a manipulator connected to a first one of said body member through a first one of the motorized joints of said plurality of motorized joints; wherein at least two consecutive of said respective rotation planes are placed at an angle from each other that is greater than 0 degrees and smaller than 90 degrees.

Further in accordance with the first embodiment, said plurality of motorized joints comprises the first, a second, a third and the last motorized joints, said respective rotation plane of said plurality of motorized joints being respectively a first, a second, a third and a last rotation plane, said first rotation plane being substantially at 45 degrees from said second rotation plane.

Still further in accordance with the first embodiment, said second rotation plane is substantially at 45 degrees from said third rotation plane.

Still further in accordance with the first embodiment, said plurality of motorized joints further comprises a fourth and a fifth motorized joints, said respective rotation plane of said plurality of motorized joints further having respectively a fourth and a fifth rotation plane, said fourth rotation plane being substantially perpendicular to said third rotation plane and said fifth rotation plane being substantially perpendicular to said last rotation plane.

Still further in accordance with the first embodiment, said fourth rotation plane is substantially parallel to said fifth rotation plane.

Still further in accordance with the first embodiment, said first, said second and said third motorized joints are smaller than said fourth, said fifth and said last motorized joints.

Still further in accordance with the first embodiment, said first, said second and said third motorized joints are of a first size and said fourth, said fifth and said last motorized joints are of a second size.

Still further in accordance with the first embodiment, said first, said second and said third motorized joints are interchangeable among themselves and said fourth, said fifth and said last motorized joints are interchangeable among themselves.

Still further in accordance with the first embodiment, said plurality of motorized joints is of a common design except for size.

Still further in accordance with the first embodiment, each of said plurality of body members, said base and said manipulator are removably attached to at least one of said plurality of motorized joints by at least one fastener removable from an exterior of each one of said plurality of body members.

Still further in accordance with the first embodiment, said manipulator comprises at least three fingers, each one of said three fingers being equipped with a sensor to detect a load applied on said one of said three fingers, each one of said sensors being operative to send a signal to a controller.

Still further in accordance with the first embodiment, said controller is operative to close said three fingers towards each other in response to receiving at least one of said signals from at least one of said sensors.

Still further in accordance with the first embodiment, said controller is operative to close said three fingers towards each other so as to equilibrate said signals among themselves.

Still further in accordance with the first embodiment, said manipulator comprises a tool port centered between said three fingers, said tool port being operative to connect a tool.

Still further in accordance with the first embodiment, said portable robotic arm is adapted to be installed on a support, said base comprising an attachment interface operative to removably attach said base to the support.

Still further in accordance with the first embodiment, said support is adapted to removably receive said attachment interface, said support being attached to a frame of a wheelchair.

Still further in accordance with the first embodiment, the robotic arm further comprises a rack for a toolset, said rack being proximate said base.

Still further in accordance with the first embodiment, said support is adapted to removably receive said attachment interface, said support being also an arm rest for a wheelchair.

Still further in accordance with the first embodiment, said support is adapted to removably receive said attachment interface, said support having attaching means for permanently attaching said support to a working surface. In accordance with a second embodiment of the present disclosure, there is provided a method for attaching a robotic arm from one support to another, comprising: providing a robotic arm having a self-contained controller; detaching the robotic arm from rigid engagement with a first support; engaging the robotic arm to a second support; and locking the robotic arm to the second support.

Further in accordance with the second embodiment, disengaging and engaging the robotic arm comprises sliding an attachment interface of the robotic arm out of/in a corresponding attachment interface in the supports.

Still further in accordance with the second embodiment, disengaging the robotic arm comprises disengaging the robotic arm from a wheelchair, while engaging the robotic arm comprises engaging the robotic arm to a table.

Still further in accordance with the second embodiment, disengaging and engaging the robotic arm comprises disengaging and engaging the robotic arm from/to a power source in the supports.

Still further in accordance with the second embodiment, providing comprises providing the robotic arm with a self-contained power source, and disengaging and engaging the robotic arm comprises disengaging and engaging the power source simultaneously with the robotic arm.

BRIEF DESCRIPTION OF DRAWINGS

These and other features of the present application will become more apparent from the following description in which reference is made to the appended drawings wherein.

DESCRIPTION OF PREFERRED EMBODIMENTS

The present application relates to a portable robotic arm that is of a modular construction so that its components are easy to assemble. Furthermore, the portable robotic arm is of a design that makes it both flexible for operation in different environments and lightweight for light applications. For example, the portable robotic arm may be used on a wheelchair and right after, disconnected from the wheelchair and connected to a work surface such as in a kitchen or in a laboratory. Conveniently, the portable robotic arm has a wrist, located close to a manipulator, where joints are placed at an angle intermediate parallel and perpendicular. This prevents a user or a bystander from pinching his fingers in the joints. Moreover, the manipulator may be equipped with fingers having sensors allowing the user to gauge how much pressure is applied on an object.

Figure 1:
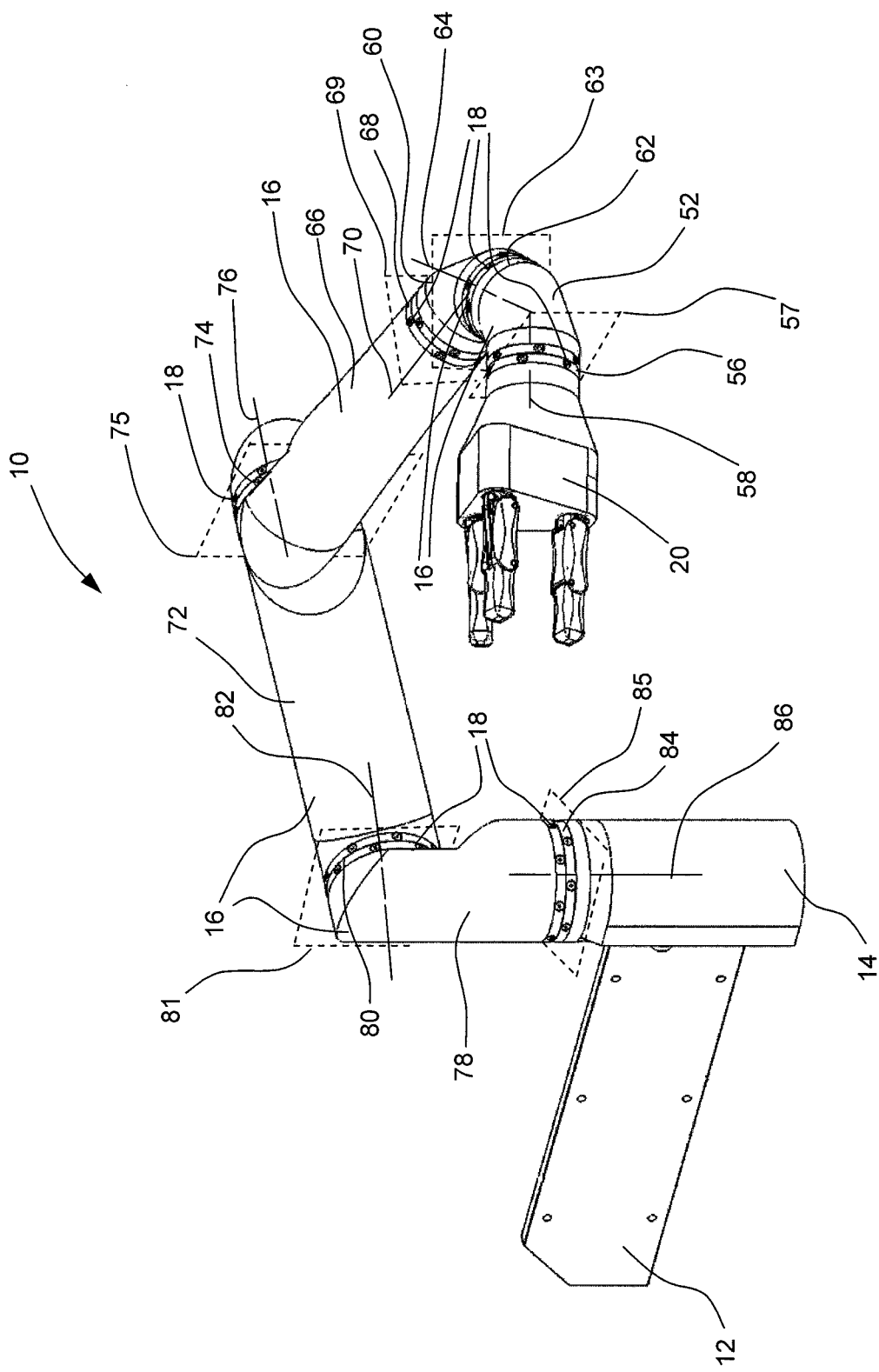
FIG. 1 is an axonometric view of a robotic arm in accordance with an embodiment of the present application.

FIG. 1 depicts the robotic arm 10. The robotic arm 10 is illustrated as a serial mechanism, and is adapted to be installed on a support 12. The robotic arm 10 comprises a base 14 to which is connected a plurality of body members 16 through a plurality of self-contained motorized joints 18. The robotic arm 10 is equipped with a manipulator 20 at its extremity to provide some dexterity, with the manipulator 20 being the interface of the robotic arm 10 with objects.

Figure 2B:
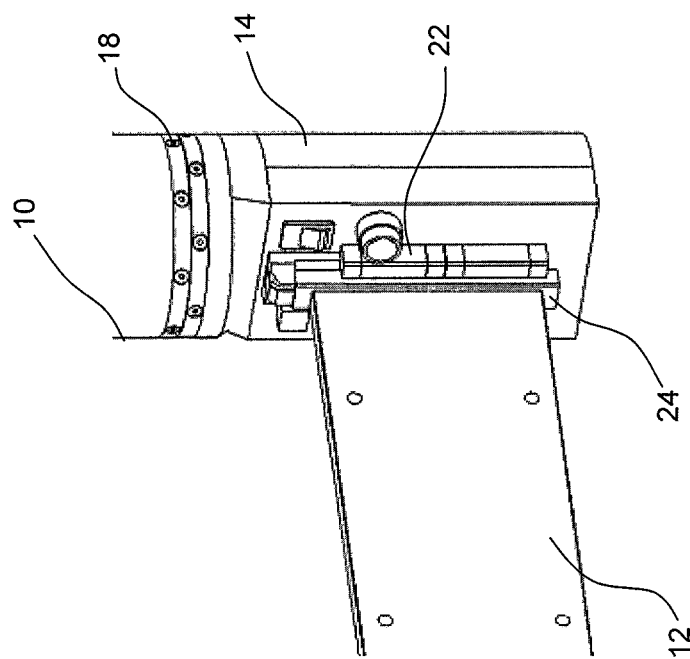
FIG. 2B is an axonometric view of a portion of the robotic arm of FIG. 1 mounted to the fixation rail of the support of FIG. 2A through the attachment interface of the robotic arm.
Figure 2A:
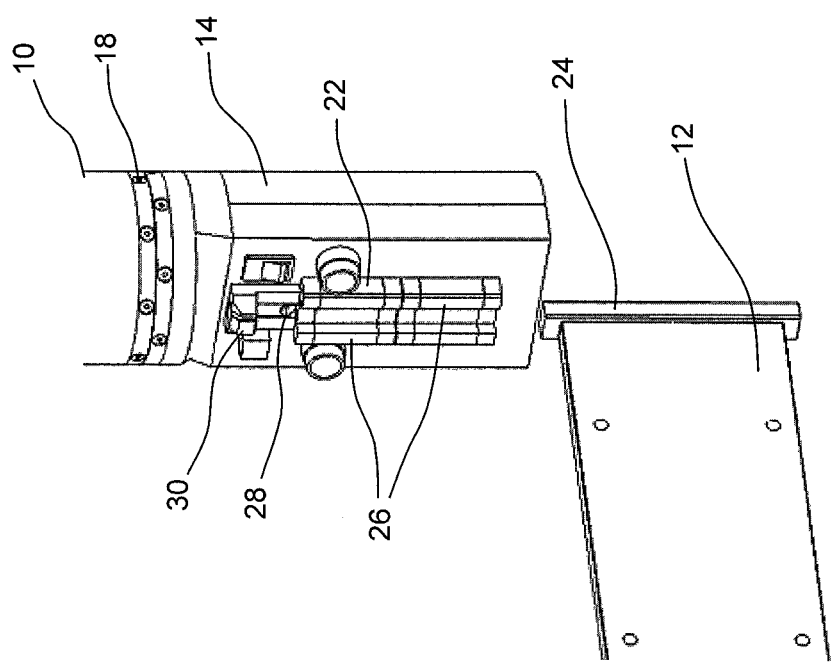
FIG. 2A is an axonometric view of a portion of the robotic arm of FIG. 1 before being mounted on a fixation rail of a support through an attachment interface in accordance with an embodiment of the present application.

The base 14 is provided with an attachment interface 22, best shown in FIGS. 2A and 2B, now concurrently referred to. This attachment interface 22 allows the base 14 of the robotic arm 10 to quickly get attached to or removed from the support 12. This allows the robotic arm 10 to easily be transported from one location to another location where a second support 12 is installed. Advantageously, many types of supports 12 may be used, each designed specifically for the application in which the robotic arm 10 will be used. For example, one support 12 may be designed so as to be fixed to a wheelchair while another support 12 may be designed so as to be attached to a work surface, such as a kitchen counter. The support 12 could even be designed as to double its function as an armrest and replace a standard armrest on the wheelchair. Since each support 12 has a similar connection that is compatible with the attachment interface 22, the robotic arm 10 may easily be transferred from the wheelchair to the working surface. This is especially convenient when a user wishes to use his robotic arm in different applications. Only one robotic arm needs to be purchased as long as each location is fitted with one purposely designed support 12.

The attachment interface 22 may adopt different designs that meet its quick connect/disconnect requirement. Different attachment interface designs will be apparent to a person skilled in the art. For example, one such design may use a standardized fixation rail 24 common to each support 12 intended to be used with the portable robotic arm 10. The base 14 is equipped with either ball or bushing linear guides 26 in which the fixation rail 24 slides (e.g., a dovetail configuration). A retaining lock 28 retains the fixation rail 24 once adequately inserted in the linear guides 26. Conveniently, a release mechanism 30, such as a push button, may be used to release the retaining lock 28 and free the base 14 from the support 12 when the robotic arm 10 is to be removed from the support 12, so as to be moved to another support 12 for example. The base 14 may also be equipped with switches and electric/electronic connectors 32 used to power and control the robotic arm 10.

The support 12 may adopt different designs depending on its intended use. For example, if the support 12 is to be fixed to a wheelchair, then the support 12 may be equipped with attaching means to temporarily attach it to the structure of the wheelchair. Alternatively, such a support 12 may be permanently fixed to the wheelchair, such as by welding it to a frame of the wheelchair. If the support 12 is intended to be installed on a work surface such as a counter, in a kitchen or in a laboratory, then the support is provided with adapted attaching means, such as mounting holes, brackets or other well known attaching means, so as to be solidly fastened to the work surface. If a temporary installation is preferred, then the support 12 may be provided with attaching means such as mounting clamps that grasp the counter. It will be apparent to a person skilled in the art that a multitude of designs adapted to each specific installation needs may be imagined. Such supports 12 may either be provided with, or provided separately from, the portable robotic arm 10.

Referring again to FIG. 1, each body member 16 is sequentially connected to another body member 16 through one motorized joint 18. Each body member 16, as much as the base 14 and the manipulator 20 are preferably made of a light and strong material. For example, advanced composite materials, such as carbon fiber in a tubular hollow format, are well suited for this application. Because each body member 16 has to support the combined weight of all the next body members 16, the next motorized joints 18, the manipulator 20, and a load held by the manipulator 20, it is advantageous to lighten as much as possible each component. Not only does this reduce the load on each component, it may also increase the load capacity of the portable robotic arm 10. Each body member 16 may be of any length that is required by a specific application. Moreover, the quantity of body members 16 used in the composition of the portable robotic arm 10 may vary from one portable robotic arm 10 to another, again depending on each application. Consequently, the quantity of motorized joints 18 varies accordingly.

Each of the body members 16, the base 14 and the manipulator 20 are removably attached to at least one motorized joint 18 by one or more fasteners 34 that are removable from the exterior of the body members 16. These fasteners may be different types of well known fasteners such as a clamp, quick release fasteners, screws, etc. Conveniently, screws are used for their easy manipulation and wide availability. Because the fasteners 34 are readily accessible from the exterior of the body members 16, the portable robotic arm 10 is easily assembled.

Each body member 16 is hollow and only contains electrical wiring running from one motorized joint 18 to the next. Advantageously, no movement transfer mechanism resides inside the body members 16. Indeed, each motorized joint 18 self-contains all the mechanics and electronics to rotate one body member 16 with respect to an adjacent body member 16. Only electrical wiring for power and command/feedback signals runs inside the body members 16. Consequently, it is very easy for a person having a minimum of dexterity and experience to assemble the portable robotic arm 10 from a knocked-down state.

Figure 3:
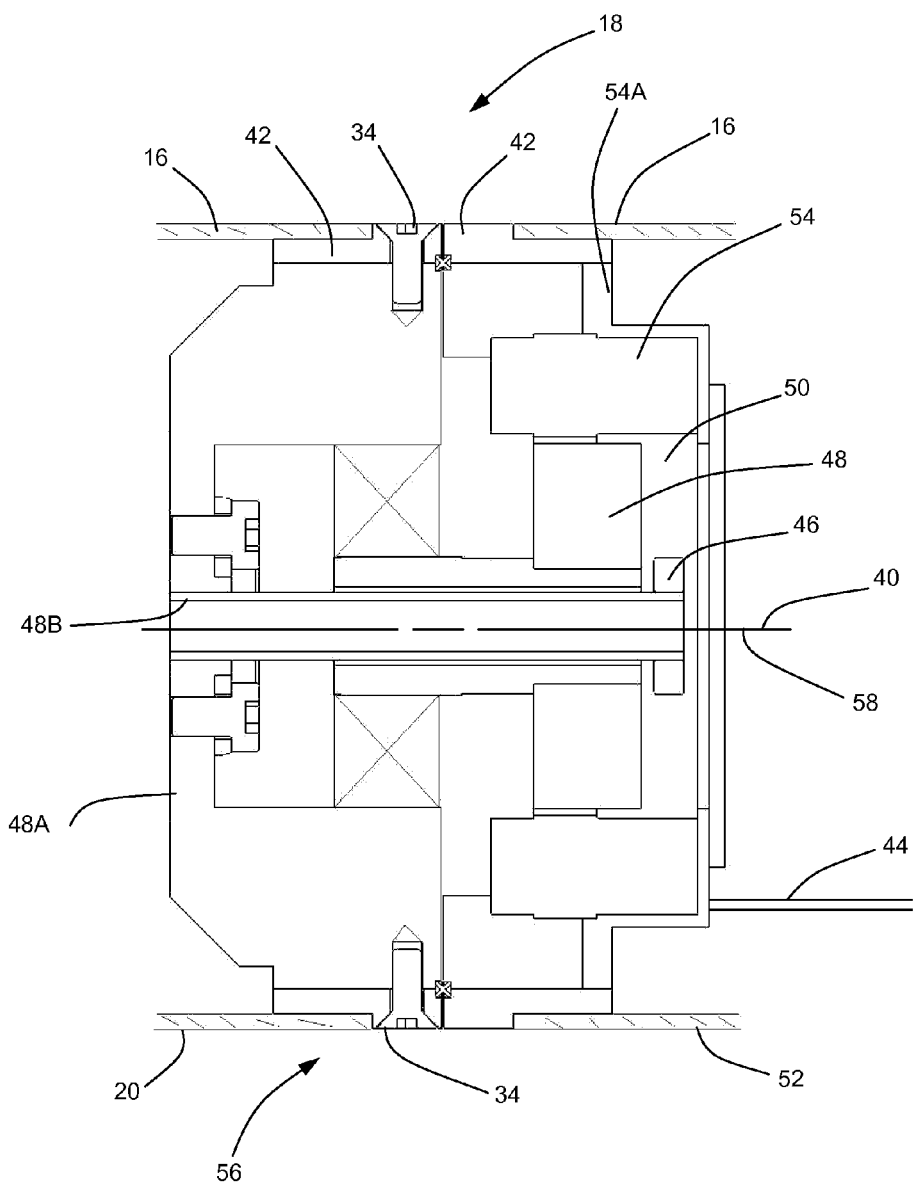
FIG. 3 is a cross-sectional side view of a modular joint located between two body members of the robotic arm in accordance with an embodiment of the present application.

FIG. 3, depicting a simplified motorized joint 18, is now referred to. Each motorized joint 18 is capable of rotating around a single respective joint axis 40. The motorized joints 18 are of a compact and light design. The motorized joints 18 are designed to receive connecting rings 42. These connecting rings 42 are structurally integrated in the body members 16. The connecting rings 42 are preferably made of aluminum.

Each motorized joint 18 is connected to the next motorized joint 18 through an electrical wiring 44. The electrical wiring 44 provides both the power and a rotation signal. A position sensor 46, which may be of the Hall effect type, is used to monitor the rotational position of the motorized joint 18. The position of the motorized joint 18 is continuously monitored and the rotation is stopped when the desired position is reached.

Upon receiving a command to rotate, a selected motorized joint 18 rotates one body member 16, or the manipulator 20, by a specified angle around its own joint axis 40 with respect to the previous body member 16 or to the base 14. For example, in FIG. 3, the manipulator 20 is connected to a rotor 48 of an electric motor 50 of the motorized joint 18 while a first body member 52 is connected to a stator 54 of the electric motor 50 via stator support 54A. The rotor 48 of the electric motor 50 includes a shaft 48B that is rotatably supported by one or more rotor supports 48A. Hence, upon receiving the command, the manipulator 20 is rotated around the joint axis 40 with respect to the first body member 52.

Reference is again made to FIG. 1. The motorized joint 18 located between the manipulator 20 and the first body member 52 is called a first motorized joint 56. The first motorized joint 56 rotates in a first rotation plane 57 on a first joint axis 58 that is normal to the first rotation plane 57. Then, the first body member 52 is connected to a second body member 60 through a second motorized joint 62 that rotates in a second rotation plane 63 on a second joint axis 64 normal to the second rotation plane 63. Similarly, the second body member 60 is connected to a third body member 66 through a third motorized joint 68 which rotates in a third rotation plane 69 on a third joint axis 70 normal to the third rotation plane 69. The third body member 66 is connected to a fourth body member 72 through a fourth motorized joint 74 which rotates in a fourth rotation plane 75 on a fourth joint axis 76 normal to the fourth rotation plane 75. The fourth body member 72 is connected to the fifth body member 78 through a fifth motorized joint 80 which rotates in a fifth rotation plane 81 on a fifth joint axis 82 normal to the fifth rotation plane 81. Finally, the fifth body member 78 is connected to the base 14 through a last motorized joint 84, which rotates in a last rotation plane 85 on a last joint axis 86 normal to the last rotation plane 85.

Again, the portable robotic arm 10 may comprise more or less body members 16. Each additional body member would be connected to another body member 16 through an additional motorized joint having an additional joint axis. For example, FIG. 1 describes a specific embodiment of the application comprising the manipulator 20, the base 14 and five body members 16.

Figure 4:
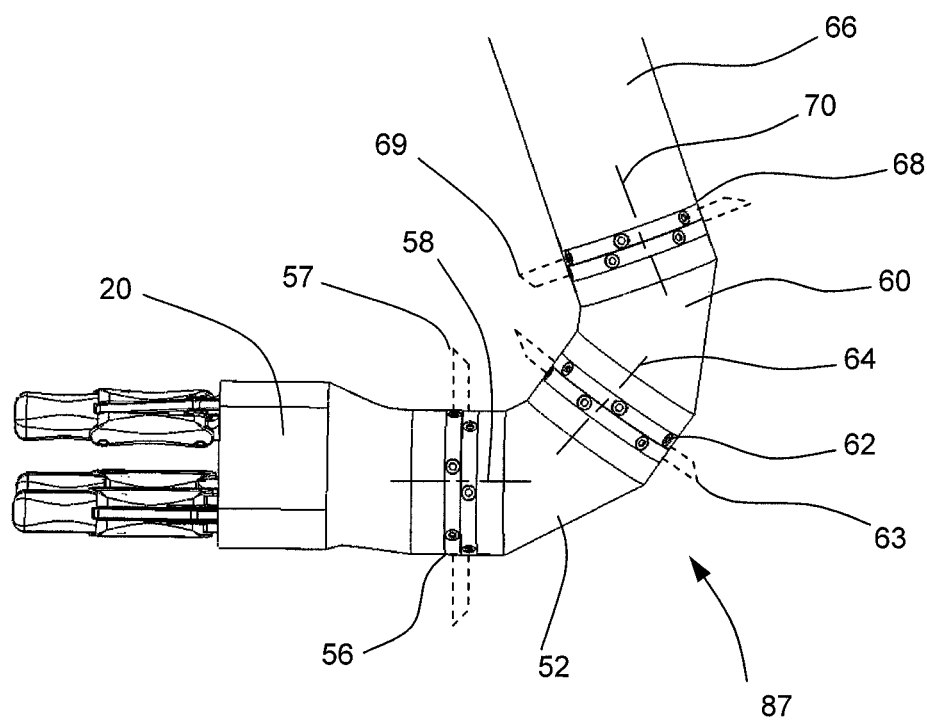
FIG. 4 is a top view of a wrist portion of the robotic arm of FIG. 1 showing an example of angles between a first, second and third joint axes in accordance with an embodiment of the present application.

Turning now to FIG. 4, there is depicted a portion of the portable robotic arm 10 known as the wrist 87, the first and second rotation planes 57,63 are positioned at an angle from each other that is more than 0 degrees, where the rotation planes would be parallel, to less than 90 degrees, where the rotation planes would be perpendicular. Similarly, the second and third rotation planes 63, 69 are positioned at an angle from each other that is more than 0 degrees and less than 90 degrees. More specifically, the angle respectively between the first and the second rotation planes 57, 63 and between the second and the third rotation planes 63, 69, are in the range of 30 to 60 degrees. More specifically, these angles could be approximately 45 degrees. Note that although three consecutive joints are shown in FIG. 4 in such an arrangement from each other, it could be that only two joints are arranged like so.

Placing the first, second and third body members 52, 60, 66 at such angles from each other provides multiple advantages compared to a typical construction of the wrist where the first, second and third joint axes are perpendicular from their adjacent rotation plane. Such advantages include first, second and third body members 52, 60 and 66 that are easier to manufacture. Also, there is a reduction in the risk that a person could pinch his fingers between two of these adjacent body members.

To keep the space used by the robotic arm 10 when retracted to a minimum, the fourth rotation plane 75 is kept substantially perpendicular to the third rotation plane 69, and the fifth rotation plane 81 is kept substantially perpendicular to the last rotation plane 85. Optionally, the fourth rotation plane 75 may be substantially parallel to the fifth rotation plane 81.

All motorized joints 18 may be of the same design and size. For example, ends of the body members 16 and the connecting rings 42 of FIG. 3 have a constant outer diameter. However, it may be advantageous to decrease the size of each motorized joints 18 the farther they are placed from the base 14. The more components such as motorized joints 18 and body members 16 are used in the construction of the portable robotic arm 10, the more load the components closer to the base 14 have to support and that, notwithstanding the whether the manipulator 20 carries a load or not. Hence, attention needs to be brought to a careful design of each of the body members 16 and of the motorized joints 18, as a function of their position along the portable robotic arm 10. Preferably, each motorized joint 18, as well as each body member 16, would be designed for the specific load it has to withstand. However, this would likely increase the cost of each component, especially of the motorized joints 18, since different models would have to be manufactured. An acceptable compromise has been found in making all of the motorized joints 18 of a common design, except for their capacity, which often is directly related to their size and weight. Hence, the first, second and third motorized joints 56, 62, 68 may be of a lesser capacity, or smaller, than the fourth, fifth and last motorized joints 74, 80, 84. More specifically, the first, second and third motorized joints 56, 62, 68 are of a common lesser capacity, or common smaller size, than the fourth fifth and last motorized joints 74, 80, 84. Even more specifically, the first, second and third motorized joints 56, 62, 68 are of a first capacity or first size and the fourth, fifth and last motorized joints 74, 80, 84 are of a second capacity or second size. Hence, advantageously, the first, second and third motorized joints 56, 62, 68 are interchangeable among themselves while the fourth, fifth and last motorized joints 74, 80, 84 are also interchangeable among themselves. The robotic arm 10 is scalable in accordance with the loads it will manipulate. For instance, greater loads will require a robotic arm 10 of greater size and capacity. The body members 16 may be structurally reinforced in view of a use with greater loads.

Figure 5:
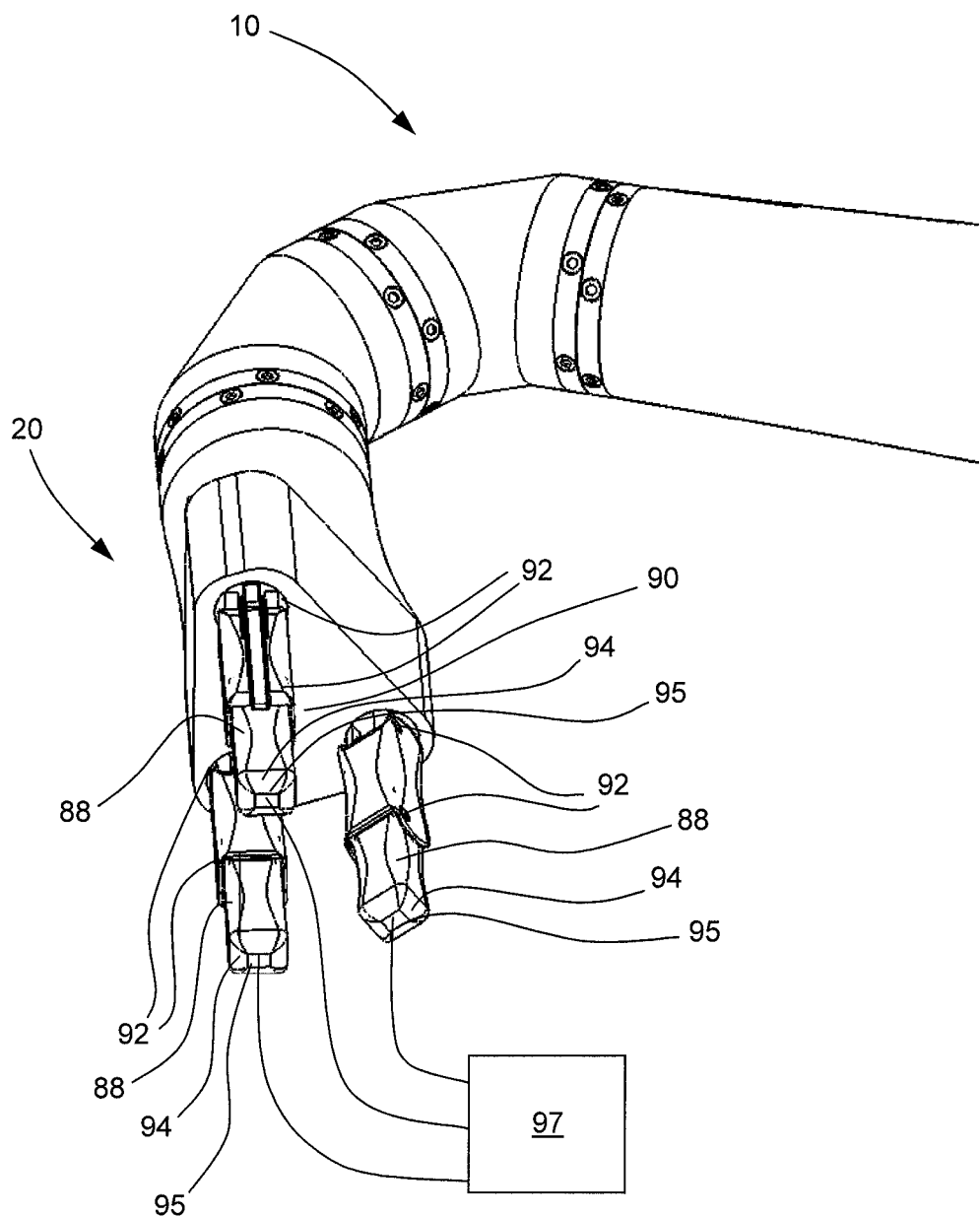
FIG. 5 is an axonometric view of a manipulator of the robotic arm of FIG. 1 in accordance with an embodiment of the present application.

Turning now to FIG. 5, there is depicted in more details the manipulator 20 of the portable robotic arm 10. The manipulator 20 comprises three fingers 88 and an optional tool port 90 centered between the three fingers 88. The fingers 88 are disposed equidistant from each other, although a different geometry may be used. Similarly, the three fingers 88 are of the same length, although different finger lengths may be used. Each one of the three fingers 88 has at least one articulation 92 allowing the fingers 88 to move towards and away from a centerline of the manipulator 20. Dexterity may be added to the manipulator 20 by providing each finger 88 with two or more articulations 92. Each finger 88 is equipped with a fingertip 94 that is conveniently made of a material having a relatively high friction coefficient. For example, the fingertips 94 may be made of elastomeric material such as rubber, which allows an easier grasping of objects.

It will be apparent to a person skilled in the art that the manipulator 20 may be equipped with more or less fingers 88, although a minimum of three is preferred. It will also be apparent that the fingers 88 may be of different lengths, shapes, have more or less articulations, be disposed in different ways to suit either a specific purpose or a more general purpose.

Optionally, each finger 88 may be equipped with a sensor 95. The sensors 95 are used to detect whether a load or a pressure is applied on a given finger 88. The sensors 95 are operatively placed on an interior face of the fingers 88 such as to detect a load when the fingers 88 comes into contact with an object. Each sensor 95 is individually operative to send a load signal to a controller 97 (illustrated at the exterior of arm 10 in FIG. 5, for schematic purposes, but with wires inside the body members 16, or wireless). The sensors 95 may be different types of sensors. For example, the sensor 95 could be a pressure sensor, a load cell measuring a force applied on one finger 88, a torque sensor measuring the torque created by a force applied on one finger 88, etc. Depending on its type, each sensor may need to be installed in a position that is different than the fingertip 94 to work properly. A person skilled in the art could envision many different ways of achieving the same result and all are intended to be covered in the present description. The sensors 95 may be connected with a wire or wirelessly to the controller 97. The connections between the sensors 95 and the controller 97 are schematically represented in FIG. 5 and the person skilled in the art will understand that if wires are used, they would advantageously be routed along an interior or an exterior of the portable robotic arm 10.

In one embodiment of the application, the controller 97 closes all three fingers 88 towards each other in response to receiving at least one load signal from at least one of the sensors 95. Optionally, when the controller 97 closes the fingers 88 towards each other to grasp an object, the controller 97 seeks to equilibrate the load signals from all sensors among themselves. Optionally, the controller 97 could take into account a movement command from the user to move the portable robotic arm 10 and alter this command based on both the movement command and the signals received from the sensors 95.

Optionally, the controller 97 may output a feedback signal to represent how much force is applied by the fingers 88 on the object held by the fingers. The feedback signal may be sent to a display or a gauge so that the user controlling the force applied by the fingers 88 may have an idea of how much force is applied by his maneuver. A feedback could also be provided to the user in the form of a force feedback on the user's controls, more or less similarly to the force feedback used in joystick controls used in video games. Optionally, the controller 97 could also itself regulate or control the force applied.

FIG. 5 also shows the tool port 90 that is used to locate and optionally connect tools in the manipulator 20. The tool port 90 may comprise both mechanical and electrical connections if such connections are required for operating a specific tool. For example, it may not be necessary to have electric connections when the tool is a spoon, but it may be necessary to have electric connections when the tool is a shaver. The tool port 90 may take many forms and shapes, such as a dimple or a boss, and may include a lock to secure the tool in place. Conveniently, the tool port 90 includes a quick connect type of connection that mechanically locks a tool 96 in place and simultaneously establishes electrical connections when required.

Figure 6:
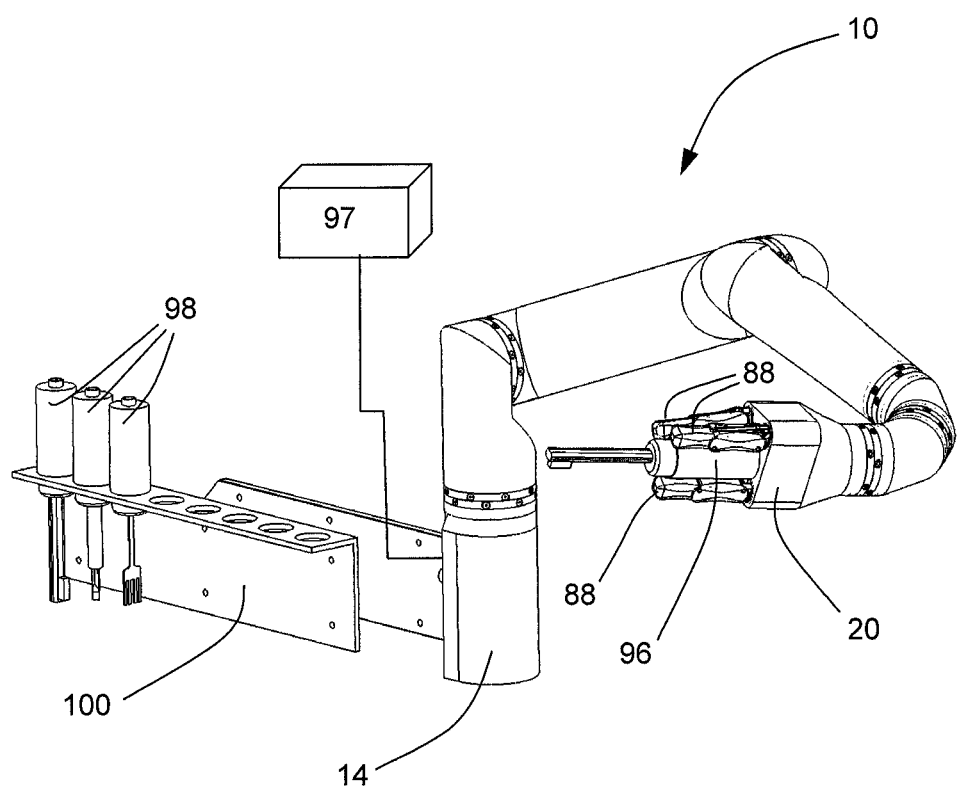
FIG. 6 is an axonometric view of the robotic arm of FIG. 1 holding a tool in its manipulator selected from the tools stored in a tool rack located within reach in accordance with an embodiment of the present application.

Turning now to FIG. 6, the tool 96, in this case a toothbrush, is shown located in the tool port 90 (not visible in this view) in the center of the manipulator 20. Optionally, the fingers 88 may be placed against the tool 96 and solidly grip the tool 96 connected in the tool port 90 to help stabilize it. Furthermore, the fingertips 94 and the tools may have details at their interface, such as dimples or a circumferential groove similar to human fingertips, to increase the grasp from the fingers 88 on the tool 96.

FIG. 6 also depicts a tool set 98 located in a tool rack 100. The tool rack 100 may either be attached to the portable robotic arm 10, or be attached to whatever supports the portable robotic arm 10, such as a wheelchair for example. Preferably, the tool rack 100 will be placed within easy reach of the manipulator 20. For example the tool rack 100 may be placed proximate the base 14. Each tool 96 of the tool set 98 may either be placed anywhere in the tool rack 100 or have a specific location. The advantage of having a specific location is that the optional controller 97 may memorize the exact location of a specific tool 96 such that the user does not have to move the portable robotic arm 10 and manipulator 20 up to the desired tool, but could merely ask the portable robotic arm 10, through an input such as a button, voice command, thought command or other, to get the desired tool 96 from the tool rack 100. The controller 97, knowing where the desired tool was last located, goes back to its location and grabs it.

Figure 7:
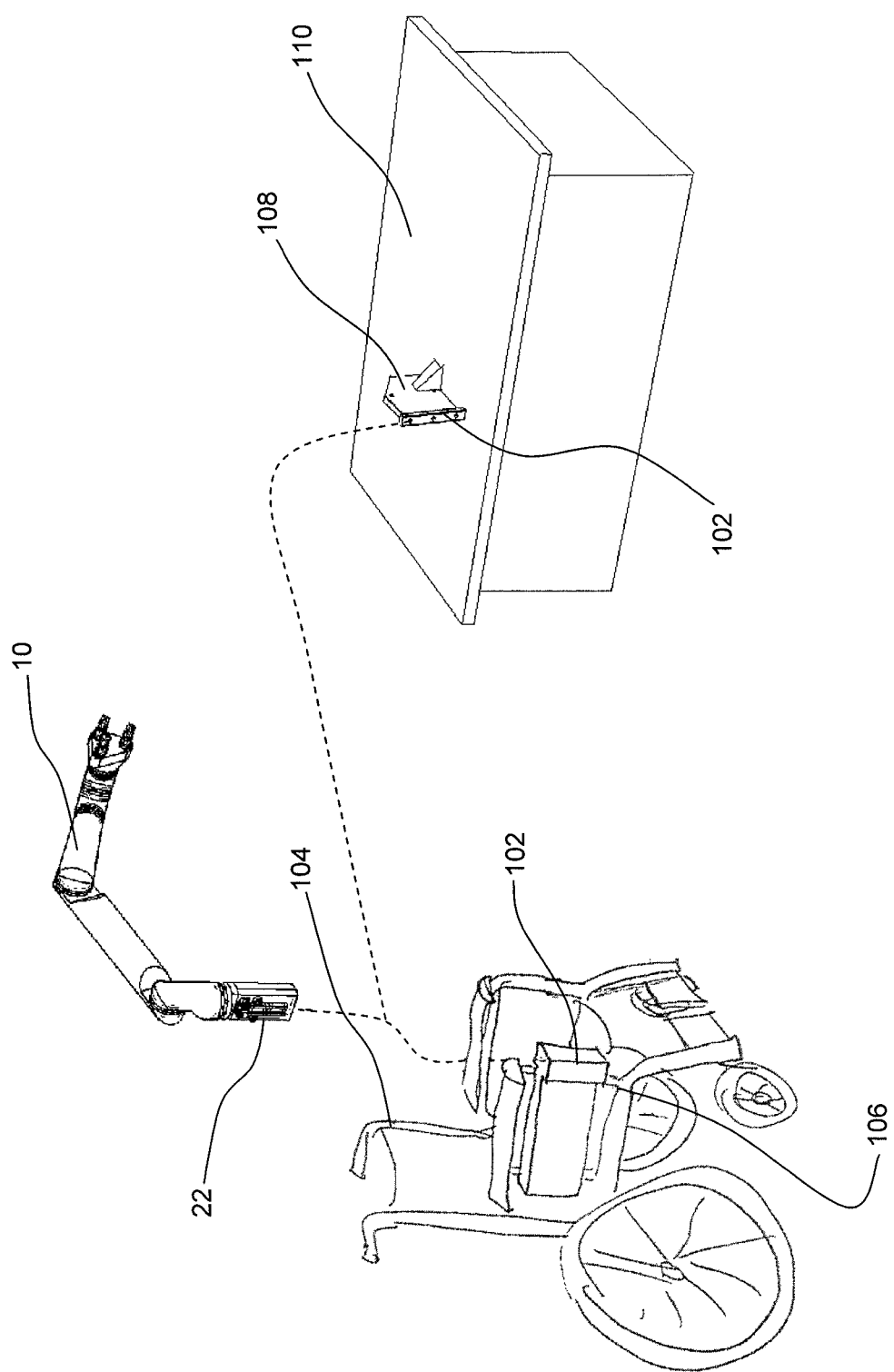
FIG. 7 is an axonometric view of the robotic arm of FIG. 1 showing the possibility of being installed either on a wheelchair or on a work surface in accordance with an embodiment of the present application.

FIG. 7 is now referred to. As the portable robotic arm 10 is often used by handicapped persons in wheelchairs, it is possible to provide the portable robotic arm 10 as a kit that also includes a wheelchair support 102 for attaching to the wheelchair 104 and capable of removably receiving the portable robotic arm 10 through the attachment interface 22. The wheelchair support 102 may be specifically designed for a specific type or model of wheelchair. Conversely, the wheelchair support 102 could be of a "universal" design that fits with as many types and models of wheelchairs as possible. A specifically designed wheelchair support 102 has the advantage of being better integrated with the specific model of wheelchair. For example, the wheelchair support 102 could be integrated as an armrest. The wheelchair support 102 comprises attaching means (not shown), such as holes or brackets, allowing the wheelchair support 102 to be solidly affixed to a frame 106 of the wheelchair 104. Optionally, a wheelchair manufacturer could integrate such a wheel-chair support in the design of its wheelchairs.

Optionally the kit may further include a work surface support 108, somewhat similar to the wheelchair support 104 in that it is capable of removably receiving the attachment interface 22, but at the same time somewhat different since the work surface support 108 is designed to be installed on a work surface 110 rather than to the wheelchair 104. Advantageously, the portable robotic arm 10 may be transferred from the wheelchair support 102 to the work surface support 108 and vice versa.

The robotic arm 10 may be a self-contained apparatus, in that the controller 97 is inside the robotic arm 10 (e.g., in the base 14). The power source may be in the robotic arm 10, or in each of the supports 104 and 108. Accordingly, when switching the robotic arm 10 from one support to another (as in FIG. 7), there is no need for disconnection of wires as all components of the robotic arm 10 are incorporated therein.

Although it is described above for applications with apparatuses for physically challenged users, such as a wheelchair, the robotic arm 10 may be used in a plurality of other applications, with other apparatuses. For instance, there are numerous applications which require robotic arms, such as remotely-controlled vehicles such as buggies or the like. In such a case, the controller of the robotic arm is equipped with a remote control system for being operated from a distance.

The present application has been described with regard to preferred embodiments. The description as much as the drawings were intended to help the understanding of the application, rather than to limit its scope. It will be apparent to one skilled in the art that various modifications may be made to the application without departing from the scope of the application as described herein, and such modifications are intended to be covered by the present description. The application is defined by the claims that follow.

The invention claimed is:

1. A robotic arm comprising:
a base;
a plurality of motorized joints, each one of said motorized joints being operative to rotate a body member with respect to one respective joint axis normal to a respective rotation plane, at least one of said motorized joints having a pair of connecting rings positioned end to end with the respective rotation plan therebetween, the connecting rings supporting a motor with a stator immovably connected to a stator support fixed to one of the connecting rings and a rotor having a shaft immovably connected to a rotor support fixed to the other of the connecting rings;
a plurality of the body members, each one of said plurality of body members being tubular and sequentially connected to ends of at least one other of said body members through one of said motorized joints, a last one of said body members being connected to said base through a last one of said motorized joints inserted into the body members, with at least a pair of the body members being interconnected by said pair of connecting rings, so as to define a constant outside diameter including the pair of connecting rings and ends of the pair of the body members interconnected by the pair of connecting rings; and a manipulator connected to a first one of said body members through a first one of said motorized joints.

2. The robotic arm of claim 1 wherein said first rotation plane being substantially at 45 degrees from said second rotation plane.

3. The robotic arm of claim 2 wherein said second rotation plane is substantially at 45 degrees from said third rotation plane.

4. The robotic arm of claim 3 wherein said fifth rotation plane is substantially perpendicular to said last rotation plane.

5. The robotic arm according to claim 1, wherein said plurality of motorized joints comprises the first, a second, a third, a fourth, a fifth and the last motorized joints, said respective rotation plane of said motorized joints being respectively a first, a second, a third, a fourth, a fifth and a last rotation plane, said first rotation plane being substantially in a range of 30 to 60 degrees from said second rotation plane, said second rotation plane being substantially in the range of 30 to 60 degrees from said third rotation plane, said third rotation plane being substantially perpendicular to said fourth rotation plane, and said fourth rotation plane being substantially parallel to said fifth rotation plane.

6. The robotic arm of claim 1 wherein said first, said second and said third motorized joints are smaller than said fourth, said fifth and said last motorized joints.

7. The robotic arm of claim 6 wherein said first, said second and said third motorized joints are of a first size and said fourth, said fifth and said last motorized joints are of a second size.

8. The robotic arm of claim 7 wherein said first, said second and said third motorized joints are interchangeable among themselves and said fourth, said fifth and said last motorized joints are interchangeable among themselves.

9. The robotic arm of claim 1 wherein said motorized joints of said plurality of motorized joints each are scaled versions of one another.

10. The robotic arm of claim 9 wherein each of said plurality of body members, said base and said manipulator are removably attached to at least one of said plurality of motorized joints by at least one fastener removable from an exterior of each one of said plurality of body members.

11. The robotic arm of claim 1 wherein said manipulator comprises at least three fingers, each one of said three fingers being equipped with a sensor to detect a load applied on said one of said three fingers, each one of said sensors being operative to send a signal to a controller.

12. The robotic arm of claim 11 wherein said controller is operative to close said three fingers towards each other in response to receiving at least one of said signals from at least one of said sensors.

13. The robotic arm of claim 12 wherein said controller is operative to close said three fingers towards each other so as to equilibrate said signals among themselves.

14. The robotic arm of claim 11 wherein said manipulator comprises a tool port centered between said three fingers, said tool port being operative to connect a tool.

15. The robotic arm of claim 1 wherein said portable robotic arm is adapted to be installed on a support, said base comprises an attachment interface operative to removably attach said base to the support.

16. The robotic arm of claim 15 further comprising said support, said support being adapted to removably receive said attachment interface, said support being attached to a frame of a wheelchair.

17. The robotic arm of claim 15 further comprising said support, said support being adapted to removably receive said attachment interface, said support having attaching means for permanently attaching said support to a working surface.

18. The robotic arm of claim 1 further comprising said support, said support being adapted to removably receive said attachment interface, said support being also an arm rest for a wheelchair.

19. The robotic arm of claim 1 further comprising a rack for a toolset, said rack being proximate said base.

20. A kit comprising:
said portable robotic arm of claim 1; and
a wheelchair support, said wheelchair support being adapted to removably receive said attachment interface, said wheelchair support having attaching means for being attached to a frame of a wheelchair.

* * * * *